United States Patent [19]
Holtermann et al.

[11] Patent Number: 5,408,827
[45] Date of Patent: Apr. 25, 1995

[54] MARINE PROPULSION DEVICE WITH IMPROVED CATALYST SUPPORT ARRANGEMENT

[75] Inventors: Theodore J. Holtermann, Brookfield; George G. Lassanske, Nashota; Lee A. Woodward, Racine, all of Wis.

[73] Assignee: Outboard Marine Corporation, Waukegan, Ill.

[21] Appl. No.: 127,883

[22] Filed: Sep. 28, 1993

[51] Int. Cl.⁶ ............................................. F01N 3/20
[52] U.S. Cl. .................................. 60/298; 60/302; 60/321
[58] Field of Search ................ 60/272, 274, 320, 321, 60/310, 302; 123/686

[56] References Cited

U.S. PATENT DOCUMENTS

| | | | |
|---|---|---|---|
| 3,817,714 | 6/1974 | Wiley | 23/288 |
| 3,852,042 | 12/1974 | Wagner | 23/288 |
| 3,898,803 | 8/1975 | Sasaki et al. | 60/305 |
| 3,992,157 | 11/1976 | Stute | 23/288 |
| 4,004,887 | 1/1977 | Stormont | 23/288 |
| 4,023,361 | 5/1977 | Kojima | 60/302 |
| 4,161,509 | 7/1979 | Nowak | 422/179 |
| 4,335,078 | 6/1982 | Ushijima et al. | 422/179 |
| 4,353,873 | 10/1982 | Noritake et al. | 422/179 |
| 4,360,957 | 11/1982 | Eng | 29/157 |
| 4,362,700 | 12/1982 | Hayashi et al. | 422/179 |
| 4,432,943 | 2/1984 | Musall et al. | 422/179 |
| 4,448,754 | 5/1984 | Isogai et al. | 422/179 |
| 4,457,141 | 7/1984 | Yoshioka | 60/299 |
| 4,662,911 | 5/1987 | Hirayama et al. | 55/282 |
| 4,707,341 | 11/1987 | Koch et al. | 422/171 |
| 4,707,987 | 11/1987 | Takada et al. | 60/310 |
| 4,735,046 | 4/1988 | Iwai | 60/302 |
| 4,831,822 | 5/1989 | Yoshimura | 60/310 |
| 4,887,427 | 12/1989 | Shinzawa | 60/302 |
| 4,900,282 | 2/1990 | Takahashi et al. | 440/89 |
| 5,042,249 | 8/1991 | Erdmannsdorfer | 60/299 |
| 5,100,351 | 3/1992 | Shibata | 440/89 |
| 5,167,934 | 12/1992 | Wolf et al. | 422/177 |
| 5,212,949 | 5/1993 | Shiozawa | 60/298 |

FOREIGN PATENT DOCUMENTS 4-27707 1/1992 Japan.
4-134118 5/1992 Japan.

Primary Examiner—Ira S. Lazarus
Assistant Examiner—Daniel J. O'Connor
Attorney, Agent, or Firm—Michael, Best & Friedrich

[57] ABSTRACT

An internal combustion engine assembly comprising an internal combustion engine including an exhaust port, an exhaust conduit communicating with the exhaust port and having an inner surface, the conduit including first and second conduit portions having respective ends, the first and second conduit portions being connected end-to-end, a catalyst which is located within the conduit and which includes catalytic material and a sleeve surrounding the catalytic material, the sleeve having a length and an outer surface spaced from the inner surface of the conduit along substantially the entire length of the sleeve, the sleeve having thereon a rigid, radially outwardly extending flange captured between the ends of the conduit portions, and a flexible gasket between the flange and the end of one of the conduit portions.

34 Claims, 2 Drawing Sheets

MARINE PROPULSION DEVICE WITH IMPROVED CATALYST SUPPORT ARRANGEMENT

BACKGROUND OF THE INVENTION

The invention relates to arrangements for supporting a catalyst in the exhaust conduit of an internal combustion engine. More particularly, the invention relates to arrangements for supporting a catalyst in the exhaust conduit of a marine propulsion device.

The substrate of an engine exhaust catalyst can reach temperatures as high as 1,600° F. while being enclosed in a housing that has a much lower temperature. It is necessary to mount the substrate within the housing in some flexible manner to accommodate the different thermal expansion of the substrate and the surrounding housing. In many automotive applications, this is accomplished by enclosing the substrate in a compressible, semi-resilient blanket of ceramic fibers or woven metal wire. This "soft" retention means not only accommodates differential expansion, but also helps to isolate the substrate from vibration and provides an insulating barrier to heat flow between the substrate and the housing.

However, under some relatively severe vibration conditions, there may be enough motion of the catalyst within the blanket to damage the blanket. The blanket may be pounded to the point that it breaks up and either falls out in pieces or is eroded away if exhaust gases are able to bypass the catalyst and flow through the blanket area.

The differential expansion between the substrate and the housing can be particularly severe in a marine application, such as in a stern drive engine, in which the catalyst must be water cooled to control the temperature in the engine compartment of the boat. In this kind of application, the catalyst may also have to be mounted directly on the engine, and the catalyst is thus exposed to more severe vibration than is a catalyst that is remotely mounted with a flexible connecting pipe.

Attention is directed to U.S. Ser. No. 782,427 (Attorney Docket No. 72012/0040), filed Oct. 25, 1991 and assigned to the assignee hereof, and to U.S. Ser. No. 822,972 (Attorney Docket No. 72012/0800), filed Jan. 21, 1992 and assigned to the assignee hereof.

Attention is also directed to the following United States and Foreign patents:

| United States of America | | |
|---|---|---|
| 3,817,714 | R. F. Wiley | June 18, 1974 |
| 3,852,042 | M. H. Wagner | December 3, 1974 |
| 3,898,803 | Sasaki, et al. | August 12, 1975 |
| 3,992,157 | Stute | November 16, 1976 |
| 4,004,887 | Stormont | January 25, 1977 |
| 4,161,509 | H. H. Nowak | July 17, 1979 |
| 4,335,078 | Ushijima, et al. | June 15, 1982 |
| 4,353,873 | Noritake, et al. | October 12, 1982 |
| 4,360,957 | E. D. Eng | November 30, 1982 |
| 4,362,700 | Hayashi, et al. | December 7, 1982 |
| 4,432,943 | Musall, et al. | February 21, 1984 |
| 4,448,754 | Isogai, et al. | May 15, 1984 |
| 4,457,141 | Yoshioka | July 3, 1984 |
| 4,662,911 | Hirayama, et al. | May 5, 1987 |
| 4,707,341 | Koch, et al. | November 17, 1987 |
| 4,707,986 | Takada, et al. | November 24, 1987 |
| 4,900,282 | Takahaski, et al. | February 13, 1990 |
| 5,042,249 | Erdmannsdoerfer | August 27, 1991 |
| 5,100,351 | Shibata | March 31, 1992 |
| 5,167,934 | Wolf, et al. | December 1, 1992 |
| 5,212,949 | Shiozawa | May 25, 1993 |
| Foreign | | |
| Japanese Patent Application No. 4-134118 | | May 8, 1992 |
| Japanese Patent Application No. 4-27707 | | January 30, 1992 |
| Japanese Utility Model Public Disclosure No. 36619/88 | | |

SUMMARY OF THE INVENTION

The invention provides a marine propulsion device comprising a propulsion unit adapted to be mounted on a boat, which propulsion unit includes a propeller shaft adapted to support a propeller, an internal combustion engine which is drivingly connected to the propeller shaft and which includes an exhaust port, an exhaust conduit communicating with the exhaust port and having an inner surface, a catalyst which is located within the conduit and which includes catalytic material, and a sleeve surrounding the catalytic material, which sleeve has a length and an outer surface spaced from the inner surface of the conduit along substantially the entire length of the sleeve, first means for substantially rigidly connecting the sleeve to the conduit at only one point along the length of the sleeve, and second means for flexibly connecting the sleeve to the conduit at a second point along the length of the sleeve.

The invention also provides an internal combustion engine assembly comprising an internal combustion engine including an exhaust port, an exhaust conduit communicating with the exhaust port and having an inner surface, which inner surface of the conduit has therein a annular groove, a catalyst which is located within the conduit and which includes catalytic material, and a sleeve surrounding the catalytic material, which sleeve has a length and an outer surface spaced from the inner surface of the conduit along substantially the entire length of the sleeve, which sleeve has thereon a rigid, radially outwardly extending flange received in the groove, and flexible material located between the inner surface of the conduit and the outer surface of the sleeve.

The invention also provides an internal combustion engine assembly comprising an internal combustion engine including an exhaust port, an exhaust conduit communicating with the exhaust port and having an inner surface, which conduit includes first and second conduit portions which have respective ends and which are connected end-to-end, a catalyst which is located within the conduit and which includes catalytic material, and a sleeve surrounding the catalytic material, which sleeve has a length and an outer surface spaced from the inner surface of the conduit along substantially the entire length of the sleeve, which sleeve has thereon a rigid, radially outwardly extending flange captured between the ends of the conduit portions, and a flexible gasket between the flange and the end of one of the conduit portions.

The invention also provides an internal combustion engine assembly comprising an internal combustion engine including an exhaust port, an exhaust conduit communicating with the exhaust port and having an inner surface, a catalyst which is located within the conduit and which includes catalytic material, and a sleeve surrounding the catalytic material, which sleeve has a length and an outer surface spaced from the inner surface of the conduit along substantially the entire length of the sleeve, first means for substantially rigidly connecting the sleeve to the conduit at only one point along the length of the sleeve, and second means for flexibly connecting the sleeve to the conduit at a second point along the length of the sleeve.

The invention also provides a coolant jacket construction comprising a first member including a first end surface, wall means defining a first interior coolant jacket, and a first passage extending between the first end surface and the first coolant jacket, a second member including a second end surface abutting the first end surface, wall means defining a second interior coolant jacket, and a second passage in alignment with the first passage and extending between the second end surface and the second coolant jacket, a tubular member extending in the first and second passages and including an inner bore communicating with the first and second passages, and sealing means on the tubular member and on each of the first and second members for preventing leakage between the tubular member and each of the first and second members.

The invention also provides a segmented exhaust pipe including an exhaust gas manifold including a mounting surface, an exhaust gas conduit opening into the mounting surface, wall means defining an interior exhaust gas manifold coolant jacket, and a passage extending between the mounting surface and the exhaust gas manifold coolant jacket, an inlet segment including an inlet mounting surface adjacent the mounting surface of the exhaust gas manifold, an outlet mounting surface, an interior exhaust gas conduit opening into the inlet and outlet mounting surfaces and communicating with the exhaust gas conduit of the exhaust gas manifold, wall means defining an interior inlet segment coolant jacket, and passages extending respectively between the inlet segment mounting surfaces and the inlet segment coolant jacket, a central segment including an inlet mounting surface adjacent the outlet mounting surface of the inlet segment, an outlet mounting surface, an interior exhaust gas conduit opening into the central segment inlet and outlet surfaces and communicating with the exhaust gas conduit of the inlet segment, wall means defining an interior central segment coolant jacket, and passages respectively extending between the central segment mounting surfaces and the central segment coolant jacket, a discharge segment including an inlet mounting surface adjacent the outlet mounting surface of the central segment, an interior exhaust gas conduit opening into the discharge segment inlet mounting surface and communicating with the exhaust gas conduit in the central segment, wall means defining an interior discharge segment cooling jacket, a passage extending between the discharge segment inlet mounting surface and the discharge segment coolant jacket, tubular members respectively extending between the inlet segment and each of the exhaust gas manifold and the central segment and between the central segment and the discharge segment and in the passages, sealing means extending between the tubular members and the exhaust gas manifold and the inlet, central, and discharge segments for preventing leakage, a catalytic element located in the central segment and including a flange captured between the outlet mounting surface of the inlet segment and the inlet mounting surface of the central segment, a discharge end having a cross sectional flow area, and a conical passage piece located adjacent the discharge end of the catalytic element and including an inlet flow area corresponding in size to the discharge flow area, and an outlet flow area having a size less than the cross sectional flow area of the discharge end of the catalytic element, means for releasably fastening the inlet segment to the exhaust gas manifold without communicating with the cooling jackets of the exhaust gas manifold and the inlet segment, and means for releasably fastening together in series the inlet segment, the central segment, and the discharge segment without communicating with the coolant jackets in the inlet segment, the central segment, and the discharge segments.

One principal feature of the invention is a catalyst mounting system with a "soft" blanket or mat-type mounting on one end of the catalyst and a more rigid mount or containment of the other end. The more rigid mount is preferably a flange that is an integral part of the catalyst sleeve. The flange is clamped between the upstream and downstream portions of the catalyst housing or exhaust conduit. This construction is particularly appropriate if the two parts of the housing are bolted together, but a similar arrangement can be used with a welded housing assembly. The inside diameter of the housing is significantly larger than the outside diameter of the sleeve so that the flange effectively acts as a diaphragm, allowing some flexibility in both the axial and angular orientation of the catalyst, but little radial motion. Growth in the thickness of the flange is accommodated by a resilient gasket on one or both sides of the flange. Radial growth of the flange is accommodated by sufficient radial clearance around the circumference of the flange. The other end of the sleeve is supported by a mat or blanket in a conventional manner. This mat or blanket may surround the entire sleeve or be limited to a band around a portion of the sleeve.

Another principal feature of the invention is the provision of a mounting arrangement that greatly reduces the stress on the blanket. The flange also substantially eliminates the possibility of blow-by of exhaust gases around the catalyst.

Other features and advantages of the invention will become apparent to those skilled in the art upon review of the following detailed description, claims and drawings.

Figure 1:
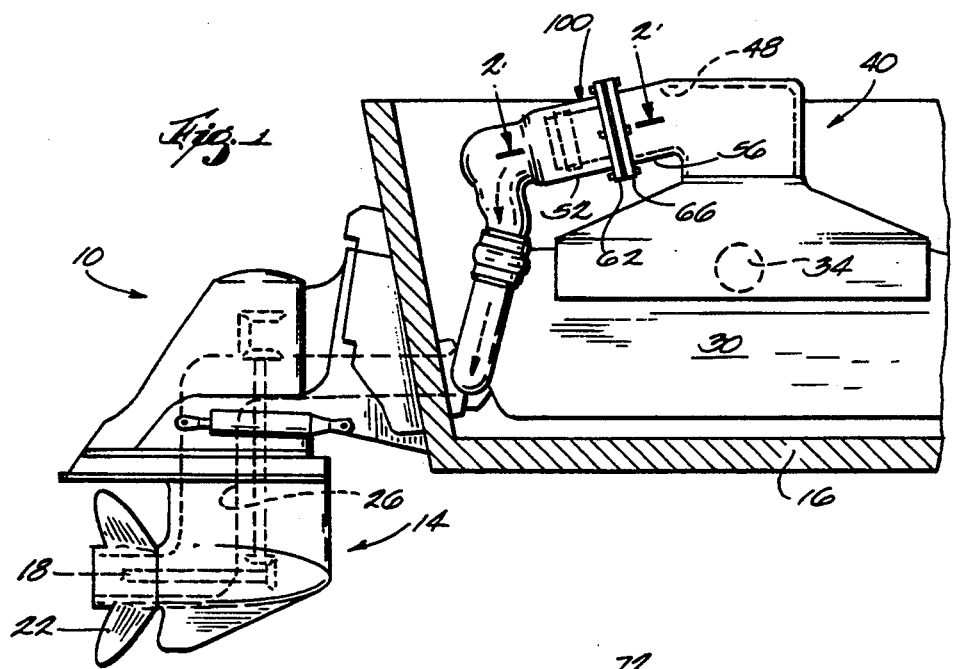
FIG. 1 is a partial side elevational view, partially broken away, of a marine propulsion device embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine propulsion device embodying the invention is illustrated in the drawings. While the preferred embodiment of the invention is a stern drive unit 10, it should be understood that the invention is applicable to other types of marine propulsion devices and to other devices including internal combustion engines.

The stern drive unit 10 includes a propulsion unit 14 mounted on a boat 16 for pivotal movement relative thereto about a generally vertical steering axis and about a generally horizontal tilt axis. The propulsion unit 14 includes a propeller shaft 18 having thereon a propeller 22. The propulsion unit 14 also includes an exhaust passageway 26 which, as is known in the art, passes through the hub of the propeller 22.

The stern drive unit 10 also comprises an internal combustion engine 30 mounted within the boat 16 and drivingly connected to the propeller shaft 18 in a known manner. The internal combustion engine 30 includes a plurality of exhaust ports 34 (one is shown in FIG. 1).

Figure 2:
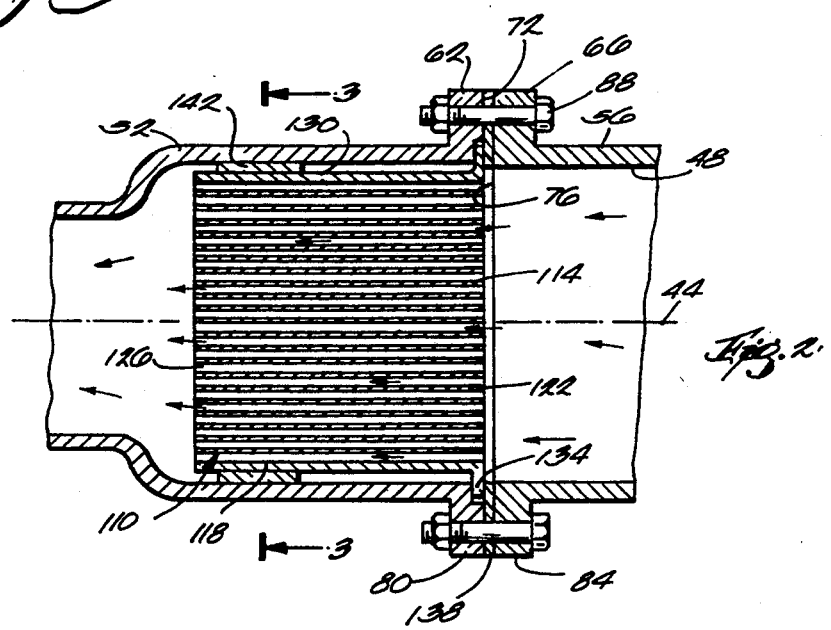
FIG. 2 is a view taken along line 2—2 in FIG. 1.

The stern drive unit 10 also comprises an exhaust conduit or housing 40 communicating between the engine exhaust ports 34 and the propulsion unit exhaust passageway 26. The exhaust conduit 40 has (see FIG. 2) a longitudinal axis 44 and a cylindrical inner surface 48, and the conduit 40 includes first and second or downstream and upstream portions 52 and 56 having respective ends 62 and 66. The ends 62 and 66 are respectively defined by planar surfaces 72 and 76 extending perpendicular to the longitudinal axis 44. The end 62 of the downstream portion 52 has thereon a radially outwardly extending flange 80, the end 66 of the upstream portion 56 has thereon a radially outwardly extending flange 84, and the conduit portions 52 and 56 are connected end-to-end by bolts 88 extending through the flanges 80 and 84.

The end 62 of the downstream portion 52 has therein (see FIG. 4) a counterbore 92 defined in part by an annular first side wall or surface 96 offset inwardly from the end surface 72. The counterbore 92 is also defined by a cylindrical inner surface 100 which is concentric with the inner surface 48 of the exhaust conduit 40 and which extends between the surface 96 and the end surface 72 of the downstream conduit portion 52. The radially inner portion of the end surface 76 defines a second side wall or surface 104, and the surfaces 96, 100 and 104 cooperate to define an annular groove 108 in the inner surface 48 of the exhaust conduit 40. The reason for the groove 108 is explained below.

Figure 3:
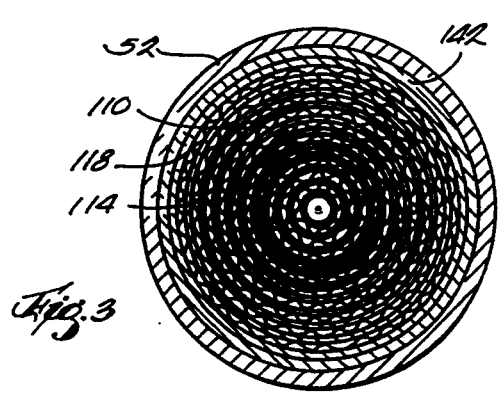
FIG. 3 is a view taken along line 3—3 in FIG. 2.

The stern drive unit 10 also comprises a catalyst or catalytic element 110 located within the exhaust conduit 40. The catalyst 110 includes (see FIGS. 2 and 3) catalytic material 114 and a tubular or cylindrical sleeve 118 surrounding the catalytic material 114. The sleeve 118 has first and second or upstream and downstream ends 122 and 126, and the sleeve 118 also has a cylindrical outer surface 130 spaced from the inner surface 48 of the exhaust conduit 40 along the entire length of the sleeve 118.

The stern drive unit 10 also comprises first means for substantially rigidly connecting the sleeve 118 to the exhaust conduit 40 at only one point along the length of the sleeve 118. While various suitable connecting means can be employed, in the illustrated construction, such means includes, on the upstream end 122 of the sleeve 118, a rigid, radially outwardly extending flange 134 substantially rigidly connected to the exhaust conduit 40. More particularly, the flange 134 is received in the groove 108 and is captured between the ends 62 and 66 of the conduit portions 52 and 56. While the flange 134 is preferably an integral part of the sleeve 118 (i.e., the sleeve 118 and the flange 134 have a one-piece construction), the flange 134 can be a separate piece welded or otherwise secured to the end of the sleeve 118.

The means for substantially rigidly connecting the sleeve 118 to the conduit preferably also includes (see FIGS. 2 and 4) an annular gasket 138 which is sandwiched between the ends of the conduit portions 52 and 56 and which extends between the flange 134 and the end of the upstream conduit portion 56. More specifically, the gasket 138 includes a radially outer portion sandwiched between the ends of the conduit portions 52 and 56, and a radially inner portion between the flange 134 and the surface 104, so that the flange 134 is located between the gasket 138 and the surface 96 and engages the surface 96.

Figure 4:
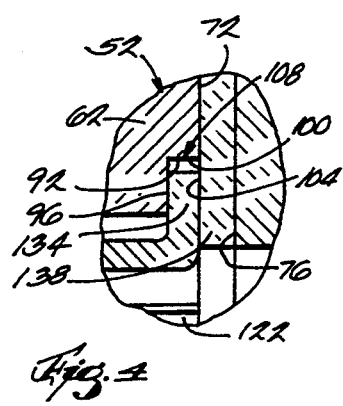
FIG. 4 is an enlarged portion of FIG. 2.

As best shown in FIG. 4, the outside diameter of the flange 134 is preferably sufficiently less than the inside diameter of the counterbore surface 100 so as to accommodate thermal expansion of the flange 134 in the radial direction. The gasket 138 accommodates thermal expansion of the flange 134 in the axial direction. The flange 134 substantially rigidly connects the sleeve 118 to the conduit 40 at only one point along the length of the sleeve 118, i.e., at the upstream end 122 of the sleeve 118. Thus, the sleeve 118 is supported in a cantilever-like fashion.

The stern drive unit 10 further comprises second means for flexibly connecting the sleeve 118 to the exhaust conduit 40 at a second point along the length of the sleeve 118. While various suitable means can be employed, in the illustrated construction, such means includes (see FIGS. 2 and 3) a ring or mat or blanket 142 of flexible material (such as ceramic fibers or woven metal wire) which surrounds the sleeve 118 and which is located between the inner surface 48 of the conduit 40 and the outer surface 130 of the sleeve 118. The ring 142 preferably has an axial length substantially less than the length of the sleeve 118 and is spaced from both the flange 134 and the downstream end 126 of the sleeve 118.

As explained previously, the flange 134 effectively acts as a diaphragm and allows a slight amount of both axial and angular movement of the catalyst 110, but allows little radial motion of the catalyst. This significantly reduces the stress on the ring 142. The flange 134 also substantially prevents exhaust gases from flowing around the catalyst 110.

Figure 5:
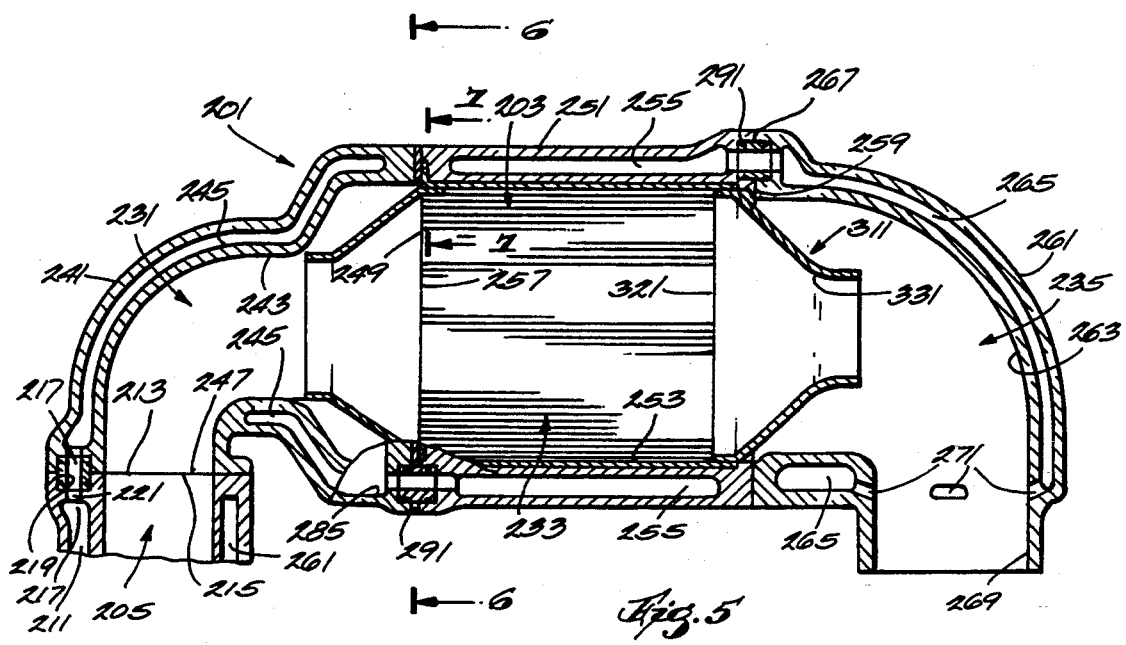
FIG. 5 is a fragmentary side elevational view, in section, of a segment of an exhaust pipe construction representing another embodiment of the invention and incorporating various of the features of the invention.
Figure 6:
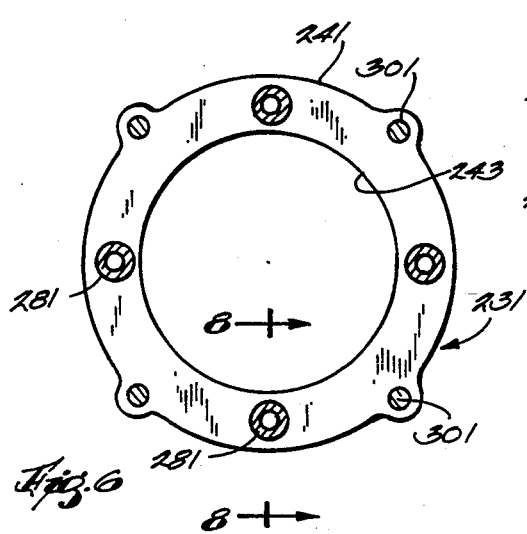
FIG. 6 is a sectional view taken along line 6—6 of FIG. 5.
Figure 8:
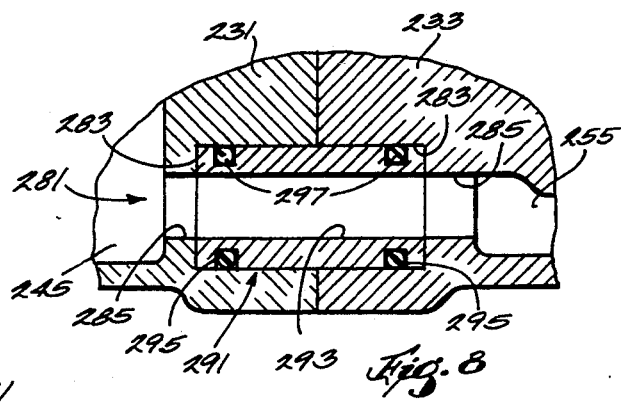
FIG. 8 is an enlarged fragmentary sectional view taken along line 8—8 of FIG. 6.

Shown in FIG. 5 is another arrangement of an exhaust pipe 201 which includes therein a catalytic element 203, such as the catalytic element 110 employed in the embodiment shown in FIGS. 1 through 4, which is cooled by suitable coolant or water jackets to reduce the temperature at the exterior surface of the exhaust pipe, and which is connected to an exhaust gas manifold or member 205.

More particularly, the exhaust gas manifold or member 205 includes wall means defining an interior exhaust manifold coolant or water jacket 211, a flat mounting or end surface 213 which is imperforate except as otherwise explained hereinafter, and which has therein an exhaust gas discharge opening 215 forming part of an exhaust gas conduit, a passage 217 extending between said mounting or end surface 213 and the coolant or water jacket 211 and including a counter bore 219 extending from the mounting or end surface 213 toward the coolant or water jacket 211, and defining between the counter bore 219 and the coolant or water jacket 211 a non-enlarged passage portion 221. Any suitable number of such passages 217 can be employed.

Still more particularly, the exhaust pipe 201 is of segmental construction to afford mounting and replacement of the catalytic element 203, and includes an inlet member or segment 231 connected to the exhaust manifold or member 205, a central generally cylindrical member or segment 233 containing the catalytic element 203, and a discharge or outlet member or segment 235.

The inlet segment 231 includes an outer wall surface 241, an inner wall surface defining an exhaust gas conduit or passage 243 communicating with the discharge opening 215, and wall means which is formed by a frangible core or in a lost foam molding process and which defines an interior coolant or water jacket 245 which, in general, extends circumferentially around the exhaust gas conduit or passage 243. If desirable, suitable ribs (not shown) can be employed to connect the radially inner and outer walls of the coolant or water jacket 245 to provide increased strength.

The inlet segment 231 also includes opposed, generally planar, annular or ring shaped, inlet and outlet end or mounting surfaces 247 and 249 which are imperforate except for the conduit or passage 243 and except as explained hereinafter.

The central segment 233 includes an outer wall surface 251, an inner wall surface defining an exhaust gas conduit or passage 253 which communicates with the exhaust gas conduit 243, and wall means which is formed by a frangible core or in a lost foam molding process and which defines an interior coolant or water jacket 255 which, in general, extends circumferentially around the exhaust conduit or passage 253. If desirable, suitable ribs (not shown) can be employed to connect the inner and outer walls of the coolant or water jacket 255 to provide increased strength.

The central segment 233 also includes opposed, generally planar, annular or ring shaped, inlet and outlet end or mounting surfaces 257 and 259 which are imperforate except for the conduit or passage 253 and except as explained hereinafter.

The discharge segment 235 includes an outer wall surface 261, an inner wall surface defining an exhaust gas conduit or passage 263 which communicates with the exhaust conduit 253, and wall means which is formed by a frangible core or in a lost foam molding process and which defines an interior coolant or water jacket 265 which, in general, extends circumferentially around the exhaust gas conduit or passage 263. If desirable, suitable ribs (not shown) can be employed to connect the inner and outer walls of the coolant water jacket 265 to provide increased strength.

The discharge segment 235 also includes an inlet end or mounting surface 267 in the form of a generally planar, annular or ring shaped, inlet surface which is imperforate except for the conduit or passage 263 and except as explained hereinafter. The discharge segment 235 also includes a discharge end portion 269 including a series of openings or apertures 271 extending between the discharge segment coolant jacket 265 and the discharge segment exhaust gas conduit or passage 263 so as to afford coolant flow into the exhaust gas conduit or passage 263 and mixing of discharge coolant with the discharge exhaust gas.

Means are provided for communicating, in series, the water or coolant jackets 211, 245, 255 and 265 in the exhaust manifold 205, in the inlet segment 231, in the central segment 233, and in the discharge or outlet segment 235.

In each case, as already noted, the end or mounting surfaces of the inlet segment 231, the central segment 233, and the discharge segment, are imperforate except for the before mentioned exhaust gas conduit or passages 215, 243, 253, and 263, and except, in each of the mounting surfaces, for one or more passages or bores 281 which extend between the end or mounting surfaces and the associated water jackets 245, 255, and 265, and which include counter bores 283 which respectively extend inwardly from the mounting or end surfaces toward the associated coolant or water jackets 245, 255, and 265, and define, between the counter bores 283 and the associated coolant or water jackets 245, 255, and 265, non-enlarged passage portions 285. Any suitable number of such passage or bores 281 can be employed.

Extending in each pair of adjacent and aligned counter bores 283 is a tubular member 291 having an interior bore 293 communicating with the adjacent passage portions 285. Means are provided on the tubular members 291 and on each of the connected segments or members for preventing leakage of coolant. While other constructions can be employed, in the disclosed construction, the tubular members 291 include, adjacent each end, an annular groove 295 in which a sealing member, such as an O-ring 297, is fitted. Thus, when the tubular members 291 are assembled in the adjacent counter bores 283, the O-rings 297 respectively sealingly engage the tubular members 291 and the connected segments or members to prevent leakage of coolant while, at the same time, affording coolant flow between the water or coolant jackets 211, 245, 255, and 265 of the connected segments or members.

Alternatively, the annular grooves 295 be provided in the counter bores 283. Other arrangements can also be employed for sealing the tubular members 291 to the connected members. In this regard, the counter bores 283 serve to prevent axial movement of the tubular members 291 and thereby hold the tubular members 291 in proper position. Further in this regard, the counter bores 283 could be omitted, as long as some means is provided for axially holding the tubular members 291 against axial movement in the passages 281.

Any suitable means, such as bolts 301, can be provided for serially and releasably connecting together the exhaust gas manifold 205 and the inlet, central, and discharge segments or member 231, 233, and 235 in such manner as to avoid communication with the coolant jackets 211, 245, 255, and 265.

The catalytic element 203 can be supported in the central segment or member 233 by means of a flange 311 extending between the inlet segment or member 231 and the central segment or member 233 and by an additional support, as for instance, the before mentioned mat or blanket 142 explained with respect to the embodiment shown in FIGS. 1 through 4.

Figure 9:
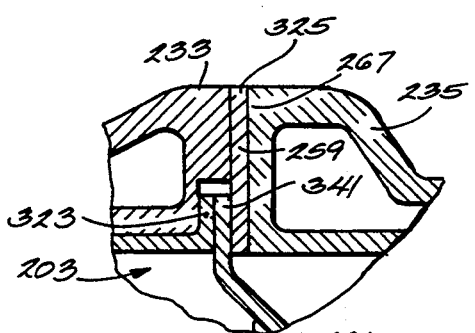
FIG. 9 is a fragmentary enlarged sectional view of another embodiment of a segmented exhaust pipe construction.
Figure 7:
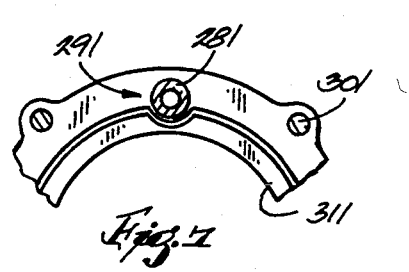
FIG. 7 is a fragmentary sectional view taken along line 7—7 of FIG. 5.

In this regard, the tubular member(s) 291 can pass through flange opening(s) (not shown) which are enlarged to afford or permit flange movement or expansion, or alternatively, the tubular member(s) 291 and the flange 311 can be arranged so that the tubular members 291 (and bolts 301) are located radially outwardly of the outer perimeter of the flange 311. Alternatively, as shown in FIG. 9, the catalytic element 203 can be provided at the outlet or discharge end 321 thereof with a flange 323 extending between the central segment 233 and the discharge segment 235. If the catalytic element 203 is so supported a resilient gasket 325 to permit axial movement of the flange 323 is also provided between the central segment 233 and the discharge segment 235.

The catalytic element 203 includes, at the outlet or discharge end 321, a discharge flow area and which desirably discharges into a conical passage 331 which includes a flow area which diametrically diminishes in size in the direction of flow until the cross sectional flow area is about the same size as the cross sectional flow area at the connection between the exhaust manifold 205 and the inlet segment or member 231. Use of the conical passage 331 serves to cause increased exhaust gas velocity and thereby inhibits or reduces the possibility of inward travel of moisture to the catalytic element 203 from the exhaust and coolant mixing region of the discharge end portion 269 of the discharge segment or member 235. The conical passage 331 can either be connected to the catalytic element 203 itself or can be supported in the passage 263 in the discharge segment or member 235 by a flange 341 which extends between the end surfaces 259 and 267 of the central and discharge segments 233 and 235 and through which the tubular member(s) 291 pass. Alternatively, the tubular members 291 (and bolts 301) can be located radially outwardly of the outer periphery of the flange 341.

The construction of the exhaust pipe 201 shown in FIGS. 5 through 9 affords means for affording coolant flow from the exhaust manifold 205 to the exhaust gas and coolant discharge mixing region in the discharge end portion 269 of the discharge segment 235 while, at the same time, effectively prevents exposure of the catalytic element 203 to moisture, either by leakage at the connections or joints or by reason of inward travel to the catalytic element 203 from the discharge end portion 269 of the discharge segment or member 235.

Various of the features of the invention are set forth in the following claims.

We claim:

1. A marine propulsion device comprising a propulsion unit adapted to be mounted on a boat, said propulsion unit including a propeller shaft adapted to support a propeller, an internal combustion engine which is drivingly connected to said propeller shaft and which includes an exhaust port, an exhaust conduit communicating with said exhaust port and having an inner surface, a catalyst which is located within said conduit and which includes catalytic material, and a sleeve surrounding said catalytic material, said sleeve having a length and an outer surface spaced from said inner surface of said conduit along substantially the entire length of said sleeve, first means for substantially rigidly connecting said sleeve to said conduit at only one point along the length of said sleeve, and second means for flexibly connecting said sleeve to said conduit at a second point along the length of said sleeve.

2. A marine propulsion device as set forth in claim 1 wherein said sleeve has opposite first and second ends, wherein said sleeve is substantially rigidly connected to said conduit adjacent said first end, and wherein said sleeve is flexibly connected to said conduit adjacent said second end.

3. A marine propulsion device as set forth in claim 2 wherein said first means includes, on said sleeve, a rigid, radially outwardly extending flange substantially rigidly connected to said conduit.

4. A marine propulsion device as set forth in claim 3 wherein said inner surface of said conduit has therein an annular groove, and wherein said flange is received in said groove.

5. A marine propulsion device as set forth in claim 4 wherein said conduit includes spaced side walls partially defining said groove, wherein said flange engages one of said side walls, and wherein said first means also includes a flexible gasket between said flange and the other of said side walls.

6. A marine propulsion device as set forth in claim 5 wherein said conduit includes a first conduit portion having an end including said first side wall, and a second conduit portion having an end including said second side wall, and wherein said gasket is sandwiched between said ends of said first and second conduit portions.

7. A marine ,propulsion device as set forth in claim 3 wherein said second means includes flexible material located between said inner surface of said conduit and said outer surface of said sleeve.

8. A marine propulsion device as set forth in claim 3 wherein said second means includes a ring of flexible material which surrounds said sleeve and which is located between said inner surface of said conduit and said outer surface of said sleeve.

9. A marine propulsion device as set forth in claim 8 wherein said ring is spaced from said flange.

10. An internal combustion engine assembly comprising an internal combustion engine including an exhaust port, an exhaust conduit communicating with said exhaust port and having an inner surface, said inner surface of said conduit having therein a annular groove, a catalyst which is located within said conduit and which includes catalytic material, and a sleeve surrounding said catalytic material, said sleeve having a length and an outer surface spaced from said inner surface of said conduit along substantially the entire length of said sleeve, said sleeve having thereon a rigid, radially outwardly extending flange received in said groove, and flexible material located between said inner surface of said conduit and said outer surface of said sleeve.

11. An assembly as set forth in claim 10 wherein said flexible material is in the form of a ring surrounding said sleeve.

12. An assembly as set forth in claim 10 wherein said conduit includes spaced side walls partially defining said groove, wherein said flange engages one of said side walls, and wherein said first means also includes a flexible gasket between said flange and the other of said side walls.

13. An assembly as set forth in claim 12 wherein said conduit includes a first conduit portion having an end including said first side wall, and a second conduit portion having an end including said second side wall, and wherein said gasket is sandwiched between said ends of said first and second conduit portions.

14. An assembly as set forth in claim 13 wherein said flange engages said first side wall, and wherein said gasket includes a radially outer portion sandwiched between said ends of said conduit portions, and a radially inner portion between said flange and said second side wall.

15. An assembly as set forth in claim 10 wherein said flexible material is spaced from said flange.

16. An internal combustion engine assembly comprising an internal combustion engine including an exhaust port, an exhaust conduit communicating with said exhaust port and having an inner surface, said conduit including first and second conduit portions which have respective ends and which are connected end-to-end, catalyst which is located within said conduit and which includes catalytic material, and a sleeve surrounding said catalytic material, said sleeve having a length and an outer surface spaced from said inner surface of said conduit along substantially the entire length of said sleeve, said sleeve having thereon a rigid, radially outwardly extending flange captured between said ends of said conduit portions, and a flexible gasket between said flange and said end of one of said conduit portions.

17. An assembly as set forth in claim 16 and further comprising a ring of flexible material which surrounds said sleeve and which is located between said inner surface of said conduit and said outer surface of said sleeve.

18. An assembly as set forth in claim 17 wherein said ring is spaced from said flange.

19. An assembly as set forth in claim 16 wherein said end of said first conduit portion includes a first surface and said end of said second conduit portion includes a second surface, said first and second surfaces cooperating to define an annular groove in said inner surface, wherein said flange is received in said groove and engages said first surface, and wherein said gasket includes a radially outer portion sandwiched between said ends of said conduit portions, and a radially inner portion between said flange and said second surface.

20. An assembly as set forth in claim 16 wherein said sleeve has an end, and wherein said flange extends from said end of said sleeve.

21. An internal combustion engine assembly comprising an internal combustion engine including an exhaust port, an exhaust conduit communicating with said exhaust port and having an inner surface, a catalyst which is located within said conduit and which includes catalytic material, and a sleeve surrounding said catalytic material, said sleeve having a length and an outer surface spaced from said inner surface of said conduit along substantially the entire length of said sleeve, first means for substantially rigidly connecting said sleeve to said conduit at only one point along the length of said sleeve, and second means for flexibly connecting said sleeve to said conduit at a second point along the length of said sleeve.

22. An internal combustion engine assembly as set forth in claim 21 wherein said sleeve has opposite first and second ends, wherein said sleeve is substantially rigidly connected to said conduit adjacent said first end, and wherein said sleeve is flexibly connected to said conduit adjacent said second end.

23. An internal combustion engine assembly as set forth in claim 22 wherein said first means includes, on said sleeve, a rigid, radially outwardly extending flange substantially rigidly connected to said conduit.

24. An internal combustion engine assembly as set forth in claim 23 wherein said inner surface of said conduit has therein an annular groove, and wherein said flange is received in said groove.

25. An internal combustion engine assembly as set forth in claim 24 wherein said conduit includes spaced side walls partially defining said groove, wherein said flange engages one of said side walls, and wherein said first means also includes a flexible gasket between said flange and the other of said side walls.

26. An internal combustion engine assembly as set forth in claim 25 wherein said conduit includes a first conduit portion having an end including said first side wall, and a second conduit portion having an end including said second side wall, and wherein said gasket is sandwiched between said ends of said first and second conduit portions.

27. An internal combustion engine assembly as set forth in claim 23 wherein said second means includes flexible material located between said inner surface of said conduit and said outer surface of said sleeve.

28. An internal combustion engine assembly as set forth in claim 23 wherein said second means includes a ring of flexible material which surrounds said sleeve and which is located between said inner surface of said conduit and said outer surface of said sleeve.

29. An internal combustion engine assembly as set forth in claim 28 wherein said ring is spaced from said flange.

30. A segmented exhaust pipe including an exhaust gas manifold including a mounting surface, an exhaust gas conduit opening into said mounting surface, wall means defining an interior exhaust gas manifold coolant jacket, and a passage extending between said mounting surface and said exhaust gas manifold coolant jacket, an inlet segment including an inlet mounting surface adjacent said mounting surface of said exhaust gas manifold, an outlet mounting surface, an interior exhaust gas conduit opening into said inlet and outlet mounting surfaces and communicating with said exhaust gas conduit of said exhaust gas manifold, wall means defining an interior inlet segment coolant jacket, and passages extending respectively between said inlet segment mounting surfaces and said inlet segment coolant jacket, a central segment including an inlet mounting surface adjacent said outlet mounting surface of said inlet segment, an outlet mounting surface, an interior exhaust gas conduit opening into said central segment inlet and outlet surfaces and communicating with said exhaust gas conduit of said inlet segment, wall means defining an interior central segment coolant jacket, and passages respectively extending between said central segment mounting surfaces and said central segment coolant jacket, a discharge segment including an inlet mounting surface adjacent said outlet mounting surface of said central segment, an interior exhaust gas conduit opening into said discharge segment inlet mounting surface and communicating with said exhaust gas conduit in said central segment, wall means defining an interior discharge segment cooling jacket, and a passage extending between said discharge segment inlet mounting surface and said discharge segment coolant jacket, tubular members respectively extending between said inlet segment and each of said exhaust gas manifold and said central segment and between said central segment and said discharge segment and in said passages, sealing means extending between said tubular members and said exhaust gas manifold and said inlet, central, and discharge segments for preventing leakage, a catalytic element located in said central segment and including a flange captured between said outlet mounting surface of said inlet segment and said inlet mounting surface of said central segment, a discharge end having a cross sectional flow area, and a conical passage piece located adjacent said discharge end of said catalytic element and including an inlet flow area corresponding in size to said discharge flow area, and an outlet flow area having a size less than the cross sectional flow area of said discharge end of said catalytic element, means for releasably fastening said inlet segment to said exhaust gas manifold without communicating with said cooling jackets of said exhaust gas manifold and said inlet segment, and means for releasably fastening together in series said inlet segment, said central segment, and said discharge segment without communicating with said coolant jackets in said inlet segment, said central segment, and said discharge segments.

31. A segmented exhaust pipe in accordance with claim 30 wherein, in each of said exhaust gas manifold and said inlet, central, and discharge segments, said passages respectively include counter bores extending inwardly from said mounting surfaces and toward said coolant jackets, and wherein said tubular members are located in said counter bores.

32. A segmented exhaust pipe in accordance with claim 30 wherein said sealing means includes resilient sealing members between said tubular members and each of said exhaust gas manifold and said inlet, central, and discharge segments.

33. A segmented exhaust pipe in accordance with claim 30 wherein said sealing members constitute O-rings and wherein said tubular members have opposite ends and include, adjacent each opposite end, an annular groove receiving one of said O-rings.

34. A segmented exhaust pipe in accordance with claim 30 which said conical passage piece includes a flange captured between said outlet mounting surface of said central segment and said inlet mounting surface of said discharge segment.

* * * * *